(12) United States Patent
Ryu et al.

(10) Patent No.: US 11,494,375 B2
(45) Date of Patent: Nov. 8, 2022

(54) METHOD AND APPARATUS FOR ANALYZING CAUSE OF PRODUCT DEFECT

(71) Applicant: Pusan National University Industry-University Cooperation Foundation, Busan (KR)

(72) Inventors: Kwang-Ryel Ryu, Busan (KR); Taekwang Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 69 days.

(21) Appl. No.: 17/176,734

(22) Filed: Feb. 16, 2021

(65) Prior Publication Data

US 2022/0197244 A1 Jun. 23, 2022

(30) Foreign Application Priority Data

Dec. 21, 2020 (KR) .......................... 10-2020-0180169

(51) Int. Cl.
*G06F 16/245* (2019.01)
*G06Q 10/06* (2012.01)
*G06F 16/2453* (2019.01)

(52) U.S. Cl.
CPC ...... *G06F 16/245* (2019.01); *G06F 16/24534* (2019.01); *G06Q 10/06395* (2013.01)

(58) Field of Classification Search
CPC ............... G06F 16/245; G06F 16/2453; G06F 16/24542; G06F 16/24535;

(Continued)

(56) References Cited

U.S. PATENT DOCUMENTS 6,996,557 B1 * 2/2006 Leung ............... G06F 16/24537
7,127,467 B2 * 10/2006 Yalamanchi ............ G06F 16/21
707/999.102

(Continued)

FOREIGN PATENT DOCUMENTS

JP       6364332 B2 *  7/2018
KR       10-1508641 B1    3/2015

(Continued)

OTHER PUBLICATIONS

Ueda et al. "Multilevel logic optimization using genetic programming technique," 2002 IEEE Region 10 Conference on Computers, Communications, Control and Power Engineering. TENCOM '02. Proceedings., 2002, pp. 620-624 vol. 1, doi: 10.1109/TENCON.2002.1181351. (Year: 2002).*

(Continued)

*Primary Examiner* — James E Richardson
(74) *Attorney, Agent, or Firm* — Christensen O'Connor Johnson Kindness PLLC (57) ABSTRACT

Disclosed are a method and apparatus for analyzing a cause of a product defect. The apparatus includes a pre-processing unit configured to receive process data and perform pre-processing for analyzing a cause of a product defect, a search unit configured to search for a primary defect cause-conditional sentence to represent a primary defect cause through solution encoding and decoding and solution fitness calculation for a plurality of candidate solutions in order to search for a conditional sentence using the pre-processed process data and to output the primary defect cause-conditional sentence, and a post-processing unit configured to receive the primary defect cause-conditional sentence, remove a redundant conditional sentence, and output the final defect cause-conditional sentence.

6 Claims, 4 Drawing Sheets

(58) Field of Classification Search
CPC ......... G06F 16/24537; G06F 16/24554; G06F 16/24558; G06F 16/2458; G06F 16/24534; G06Q 10/06395
See application file for complete search history.

(56) References Cited

U.S. PATENT DOCUMENTS

| | | | |
|---|---|---|---|
| 8,626,745 B2* | 1/2014 | Okamoto | G06F 16/2454 707/715 |
| 9,791,855 B2 | 10/2017 | Han et al. | |
| 2011/0078134 A1* | 3/2011 | Bendel | G06F 16/22 707/E17.131 |
| 2015/0046379 A1* | 2/2015 | Cantin | G06N 3/126 706/13 |
| 2016/0292188 A1* | 10/2016 | Horn | G05B 23/0216 |

FOREIGN PATENT DOCUMENTS

| | | |
|---|---|---|
| KR | 10-2015-0139334 | 12/2015 |
| KR | 10-2019-0060547 A | 6/2019 |

OTHER PUBLICATIONS

Kessentini et al. "Design Defects Detection and Correction by Example," 2011 IEEE 19th International Conference on Program Comprehension, 2011, pp. 81-90, doi: 10.1109/ICPC.2011.22. (Year: 2011).*

Office Action dated May 26, 2022 in corresponding Korean Application No. 10-2020-0180169, filed Dec. 21, 2020, 7 pages.

* cited by examiner

| Product ID | Process 1-Sensor 1 | Process 1-Sensor 2 | Process 2-Sensor 1 | ... | Determine good quality |
|---|---|---|---|---|---|
| PROD-001 | 3.4 | 0 | 100 | | Defect |
| PROD-002 | 5.9 | 1 | 120 | | Normal |
| PROD-003 | 11.2 | 0 | 115 | | Normal |
| ... | | ... | | | |
| PROD-999 | 4.2 | 0 | 100 | | Normal |

METHOD AND APPARATUS FOR ANALYZING CAUSE OF PRODUCT DEFECT

CROSS-REFERENCE TO RELATED APPLICATION

This application is based on and claims priority under 35 U.S.C. 119 to Korean Patent Application No. 10-2020-0180169, filed on Dec. 21, 2020 in the Korean intellectual property office, the disclosure of which is herein incorporated by reference in its entirety.

TECHNICAL FIELD

The present disclosure relates to a method and apparatus for analyzing a cause of a product defect using collected process data.

BACKGROUND OF THE INVENTION

For efficient production management, there is a tendency that the number of smart factories capable of collecting data by constructing an IoT environment in a factory and installing several sensors in a process is increased. For efficient management in a manufacturing plant, to reduce a defect rate by analyzing a cause of a product defect is a very important problem. In a conventional technology, to analyze a cause of a product defect is dependent on subjective opinions based on experiences of an onsite specialist, but an objective cause of a defect may be analyzed based on process data collected in the smart factory. Accordingly, there is a need for technology for analyzing a cause of a defect using collected process data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a method and apparatus for reducing a defect rate by analyzing an objective cause of a defect based on process data collected in a smart factory for efficient management in a manufacturing plant.

In one aspect, a proposed apparatus for analyzing a cause of a product defect includes a pre-processing unit configured to receive process data and perform pre-processing for analyzing a cause of a product defect, a search unit configured to search for a primary defect cause-conditional sentence to represent a primary defect cause through solution encoding and decoding and solution fitness calculation for a plurality of candidate solutions in order to search for a conditional sentence using the pre-processed process data and to output the primary defect cause-conditional sentence, and a post-processing unit configured to receive the primary defect cause-conditional sentence, remove a redundant conditional sentence, and output the final defect cause-conditional sentence.

The pre-processing unit receives the process data including an identifier of a product and sensor values collected according to a production flow of the product, removes process data having an error, and limits an attribute having a consecutive value or an attribute having a plurality of types of values to a predetermined number of types of values.

The search unit searches for the primary defect cause-conditional sentence based on a search setting value, including a maximum length of a conditional sentence that limits an attribute entering the conditional sentence, the number of evaluations for searching for the conditional sentence, and the number of conditional sentences to represent the primary defect cause-conditional sentence, and outputs the primary defect cause-conditional sentence through a genetic algorithm for constructing a population including the plurality of candidate solutions, calculating the fitness of each candidate solution, and searching for an optimal solution while evolving the population through evolutionary computation.

The search unit converts each of the plurality of candidate solution, each encoded into a real number of 0 to 1, into an operator and a conditional expression using head, body, and tail tables, generates a tree until the tree is sequentially available, converts the tree into the primary defect cause-conditional sentence, and evaluates a degree that the primary defect cause-conditional sentence indicates a cause of a defect through the solution fitness calculation.

The post-processing unit receives the primary defect cause-conditional sentence, removes a redundant portion from each of the primary defect cause-conditional sentences, and removes a conditional sentence based on results of the solution fitness calculation calculated in the search unit.

In another aspect, a proposed method of analyzing a cause of a product defect includes receiving, by a pre-processing unit, process data and performing pre-processing for analyzing a cause of a product defect, searching for, by a search unit, a primary defect cause-conditional sentence to represent a primary defect cause through solution encoding and decoding and solution fitness calculation for a plurality of candidate solutions in order to search for a conditional sentence using the pre-processed process data and outputting the primary defect cause-conditional sentence, and receiving, by a post-processing unit, the primary defect cause-conditional sentence, removing a redundant conditional sentence, and outputting the final defect cause-conditional sentence.

According to various embodiments of the present disclosure, for efficient production management, an objective cause of a defect can be analyzed based on process data collected in a smart factory by constructing an IoT environment in a manufacturing plant and installed a plurality of installed sensors. Accordingly, a defect rate can be reduced by analyzing a cause of a product defect for efficient management of a manufacturing plant.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, embodiments of the present disclosure are described in detail with reference to the accompanying drawings.

Figure 1:
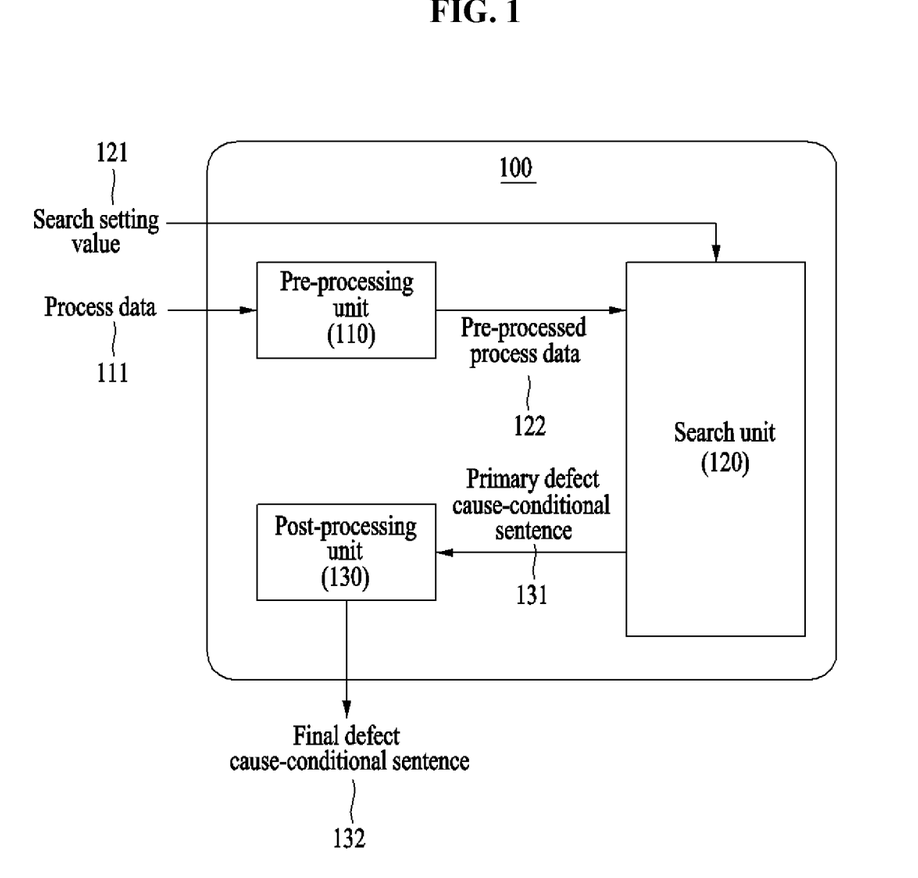
FIG. 1 is a diagram illustrating a configuration of an apparatus for analyzing a cause of a product defect according to an embodiment of the present disclosure.

FIG. 1 is a diagram illustrating a configuration of an apparatus for analyzing a cause of a product defect according to an embodiment of the present disclosure.

A proposed apparatus 100 for analyzing a cause of a product defect includes a pre-processing unit 110, a search unit 120, and a post-processing unit 130.

The pre-processing unit 110 receives process data 111 and performs pre-processing for analyzing a cause of a product defect.

According to an embodiment of the present disclosure, for efficient production management, process data for analyzing an objective cause of a defect can be collected by constructing an IoT environment in a manufacturing plant and installing a plurality of sensors.

The pre-processing unit 110 receives the process data 111 including the identifier of a product and sensor values collected according to a production flow of the product, pre-processes the process data in a form easy to analyze the process data by removing process data including an error and limiting an attribute having a consecutive value or an attribute having a plurality of types of values to a predetermined number of types of values, and transmits the pre-processed process data 122 to the search unit 120.

More specifically, the pre-processing unit 110 makes the input process data in a form easy to be analyzed. In the first step for the pre-processing, erroneously input values including an error when the process data is collected are removed. For example, a record including an NaN value or a record including an attribute value having a numerical value not present in reality, among attribute values, is deleted.

In the second step for the pre-processing, an attribute having a consecutive value or an attribute having many types of values is simplified to have a predetermined number of types. For example, if an attribute value may have a real number between 0 and 100, the attribute may be simplified to have a section 1 when the attribute value is 0 or more to less than 25, may be simplified to have a section 2 when the attribute value is 25 or more to less than 50, may be simplified to have a section 3 when the attribute value is 50 or more to less than 75, and may be simplified to have a section 4 when the attribute value is 75 or more to less than 100.

Figure 2:
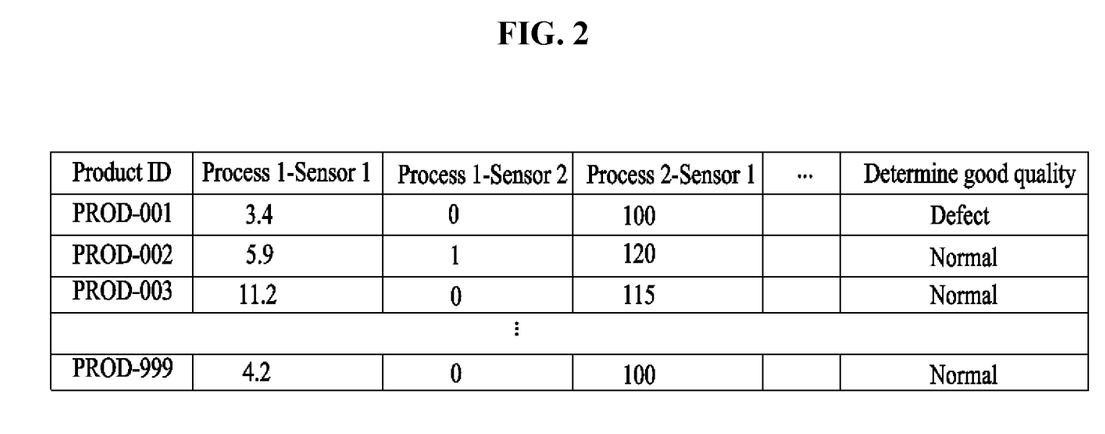
FIG. 2 is a diagram illustrating a process data structure according to an embodiment of the present disclosure.

FIG. 2 is a diagram illustrating a process data structure according to an embodiment of the present disclosure.

As illustrated in FIG. 2, process data input to the apparatus for analyzing a cause of a product defect according to an embodiment of the present disclosure may be composed of the identifier (ID) of a product (i.e., a product ID), sensor values (e.g., a sensor 1 and a sensor 2) collected according to a production flow of the product (e.g., a process 1 and a process 2), and a determination value indicative of good quality or a defect.

In order to search for a conditional sentence using the pre-processed process data 122, the search unit 120 searches for a primary defect cause-conditional sentence 131 to represent a primary defect cause through solution encoding and decoding and solution fitness calculation for a plurality of candidate solutions, and outputs the primary defect cause-conditional sentence. Each of the candidate solutions is represented (i.e., encoded) as a list of real numbers between 0 and 1. The candidate solution is decoded into a sentence to represent a characteristic cause of a defect. The length (i.e., the number of real numbers between 0 and 1) of the candidate solution is proportional to a value k input by a user (2k+1).

The primary defect cause-conditional sentence is searched for based on a search setting value 121, including a maximum length of a conditional sentence that limits an attribute entering the conditional sentence, the number of evaluations for searching for the conditional sentence, and the number of conditional sentences to represent the primary defect cause-conditional sentence.

The maximum length of the conditional sentence is necessary as a first search setting value used in the search unit 120. As the number of attributes entering the conditional sentence is increased, the length of the conditional sentence is increased. Accordingly, search costs may be exponentially increased unless the length is limited. For this reason, a maximum length of the conditional sentence needs to be set. A second search setting value is the number of evaluations for searching for the conditional sentence. A better conditional sentence may be searched for as the number of evaluations is increased, but more time is wasted that much. For this reason, the number of evaluations may be limited. A third search setting value is the number of primary conditional sentences. The search unit outputs conditional sentences corresponding to a preset number of conditional sentences, and the final defect cause-conditional sentence 132 from which a redundant and meaningless conditional sentence has been removed by the post-processing unit 130 is finally output. Such search setting values used in the search unit 120 merely correspond to an embodiment, and the present disclosure is not limited thereto. The conditional sentence may be searched for by applying various search setting values, in addition to a maximum length of a conditional sentence, the number of evaluations for searching for the conditional sentence, and the number of conditional sentences to represent the primary defect cause-conditional sentence.

The primary defect cause-conditional sentence is output through a genetic algorithm for constructing a population including a plurality of candidate solutions, calculating the fitness of each of the candidate solutions, and searching for an optimal solution while evolving the population through evolutionary computation.

More specifically, each of the plurality of candidate solution each encoded into a real number of 0 to 1 is converted into an operator and a conditional expression using head, body, and tail tables. Thereafter, a tree is generated until the tree is sequentially available, and is converted into the primary defect cause-conditional sentence. A degree that the primary defect cause-conditional sentence indicates a cause of a defect is evaluated through solution fitness calculation. A solution encoding and decoding process is more specifically described with reference to FIG. 3.

The post-processing unit 130 receives the primary defect cause-conditional sentence 131, removes a redundant conditional sentence, and outputs the final defect cause-conditional sentence 132.

The post-processing unit 130 receives the primary defect cause-conditional sentence, removes a redundant portion of each primary defect cause-conditional sentence, and removes a conditional sentence based on the results of solution fitness calculation calculated by the search unit 120.

The post-processing unit 130 performs the step of finally removing a meaningless conditional sentence among primary defect cause-conditional sentences retrieved by the search unit 120 or deleting a meaningless conditional expression from a conditional sentence, and a detailed method thereof is as follows.

First, a redundant portion is removed from each primary defect cause-conditional sentence. For example, an (A and B) portion may be removed because a conditional sentence "A or (A and B)" is the same as A.

Second, if WRA (to be more specifically described below) is not increased meaningfully although the length of a conditional sentence has been increased, a long conditional sentence is deleted. For example, although conditional sentences "A", and "A and B" are searched for, the WRA of the conditional sentence "A and B" is not better than that of the conditional sentence "A", the conditional sentence "A and B" is deleted. According to an embodiment of the present disclosure, it may be determined that the WRA has been meaningfully increased when the WRA is increased by 5% or more compared to a previous value.

The final defect cause-conditional sentence of a product, output by the apparatus for analyzing a cause of a product defect according to an embodiment of the present disclosure, has a form, such as "it is a defect when ~." For example, in the process data of FIG. 2, a conditional sentence, such as "it is a defect when a value of process 1-sensor 1 is 0 or more to 4.0 or less and a value of process 2-sensor 1 is 100", may be output.

Figure 3:
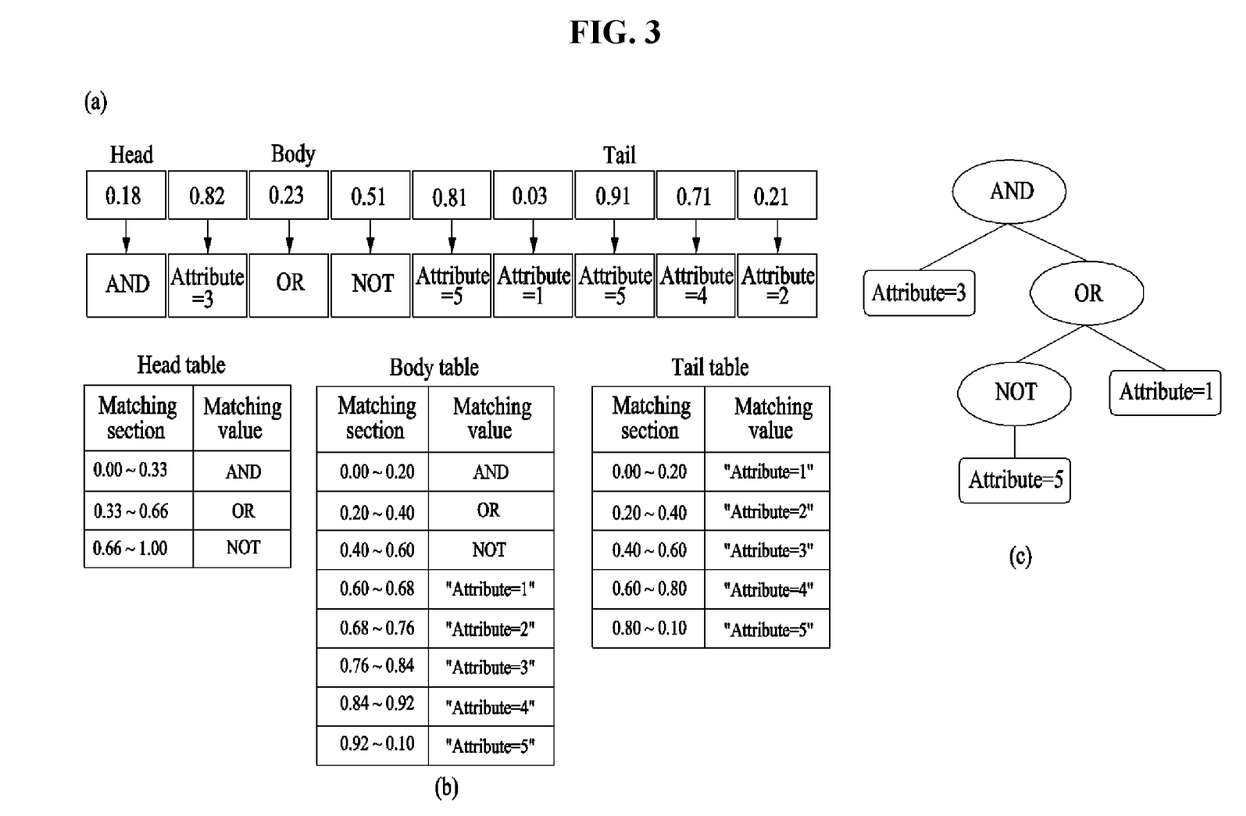
FIG. 3 is a diagram illustrating an example of solution encoding and decoding according to embodiments of the present disclosure.

FIG. 3 is a diagram illustrating an example of solution encoding and decoding according to embodiments of the present disclosure.

The search unit according to an embodiment of the present disclosure searches for a primary defect cause-conditional sentence to represent a characteristic cause of a defect based on pre-processed process data. A genetic algorithm may be used as a search algorithm for searching the primary defect cause-conditional sentence. The genetic algorithm is merely an embodiment, and the present disclosure is not limited thereto. Various algorithms for searching for the primary defect cause-conditional sentence in addition to the genetic algorithm may be applied.

The genetic algorithm is a widely known search algorithm, and it constructs a population composed of a plurality of candidate solutions, calculates the fitness of each candidate solution, and then searches for an optimal solution while evolving the population through evolutionary computation.

For example, a maximum length of a conditional sentence is a maximum length of the conditional sentence input by a user, and may be determined as the length of a solution. If a maximum length k of the conditional sentence is given, a total length is 2k+1.

Referring to FIG. 3(a), a solution may be composed of a head portion, a body portion, and a tail portion. The length of the head portion is 1, the length of the body portion is k−1, and the length of the tail portion is k+1. In all the portions, a real number is between 0 and 1. This value is decoded by being matched with a conditional expression or an operator that constructs a conditional sentence.

A term "conditional expression" according to an embodiment of the present disclosure indicates "(attribute)=(section of value)" that constructs conditionality. For example, a conditional expression according to a sentence reading "it is a defect when a value of attribute1 is X and a value of attribute2 is Y." may be indicated as "attribute1=X", "attribute2=Y."

The head portion is matched with only the operator, the body portion is matched with both the operator and the conditional expression, and the tail portion is matched with only the conditional expression. The operator is matched as one of AND, OR, or NOT. The conditional expression is matched as one of all attributes which may be generated from pre-processed process data and a combination of values of the attributes. FIG. 3 illustrates an example of solution encoding and decoding when data composed of one attribute having a value of a section 5 and the length k of a solution, that is, 4, are input.

As may be seen from FIG. 3(a), a solution encoded into a real number of 0 to 1 is converted into an operator and a conditional expression using head, body, and tail tables of FIG. 3(b). Thereafter, as in FIG. 3(c), a tree is generated until the tree is sequentially available, and is converted into the final conditional sentence. When the tree is generated, each of AND and OR may have two child nodes, NOT may have one child node, and a conditional expression node cannot have a child node. The conditional sentence generated as described above is as follows: (attribute=3) AND ((attribute≠5) OR (attribute=1)).

The fitness of the solution needs to be calculated as a value on which how the conditional sentence well indicates a cause of a defect can be evaluated. That is, it is necessary to check how many cases the conditional sentence includes and whether the conditional sentence covers many defect cases while not covering how many normal products. To this end, the following calculation formula WRA is used:

$$\text{WRA (Cond} \rightarrow \text{Class)} = p(\text{Cond}) \cdot (p(\text{Class}|\text{Cond}) - p(\text{Class}))$$

In the above formula, p(Cond) indicates a ratio of records that satisfy a conditional sentence in input process data. p(Class|Cond) refers to a ratio of records that satisfy the conditional sentence among defect data. p(Class) indicates a ratio of defect records among all data.

Figure 4:
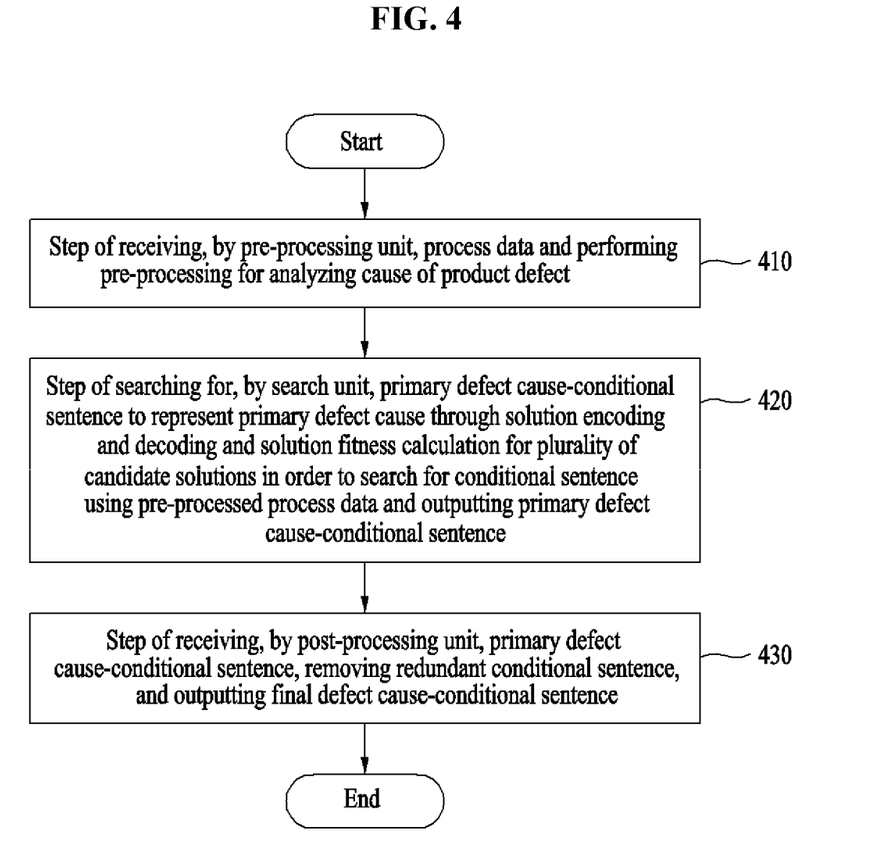
FIG. 4 is a flowchart for describing a method of analyzing a cause of a product defect according to an embodiment of the present disclosure.

FIG. 4 is a flowchart for describing a method of analyzing a cause of a product defect according to an embodiment of the present disclosure.

A proposed method of analyzing a cause of a product defect includes the step 410 of receiving, by the pre-processing unit, process data and performing pre-processing for analyzing a cause of a product defect, the step 420 of searching for, by the search unit, a primary defect cause-conditional sentence to represent a primary defect cause through solution encoding and decoding and solution fitness calculation for a plurality of candidate solutions in order to search for a conditional sentence using the pre-processed process data and outputting the primary defect cause-conditional sentence, and the step 430 of receiving, by the post-processing unit, the primary defect cause-conditional sentence, removing a redundant conditional sentence, and outputting the final defect cause-conditional sentence.

At step 410, the pre-processing unit receives process data and performs pre-processing for analyzing a cause of a product defect.

According to an embodiment of the present disclosure, for efficient production management, process data for analyzing an objective cause of a defect may be collected by constructing an IoT environment in a manufacturing plant and installing a plurality of sensors.

The pre-processing unit receives the process data including the identifier of a product and sensor values according to a production flow of the product, pre-processes the process data in a form easy to analyze the process data by removing process data including an error and limiting an attribute having a consecutive value or an attribute having a plurality of types of values to a predetermined number of types of values, and transmits the pre-processed process data to the search unit.

More specifically, the pre-processing unit makes the input process data in a form easy to be analyzed. In the first step for the pre-processing, erroneously input values including an error when the process data is collected are removed. For example, a record including an NaN value or a record including an attribute value having a numerical value not present in reality, among attribute values, is deleted.

In the second step for the pre-processing, an attribute having a consecutive value or an attribute having many types of values is simplified to have a predetermined number of types. For example, if an attribute value may have a real number between 0 and 100, the attribute may be simplified to have a section 1 when the attribute value is 0 or more to less than 25, may be simplified to have a section 2 when the attribute value is 25 or more to less than 50, may be simplified to have a section 3 when the attribute value is 50 or more to less than 75, and may be simplified to have a section 4 when the attribute value is 75 or more to less than 100.

At the step 420, the search unit searches for a primary defect cause-conditional sentence to represent a primary defect cause through solution encoding and decoding and solution fitness calculation for a plurality of candidate solutions in order to search for a conditional sentence using the pre-processed process data, and outputs the primary defect cause-conditional sentence.

The primary defect cause-conditional sentence is searched for based on a search setting value, including a maximum length of a conditional sentence that limits an attribute entering the conditional sentence, the number of evaluations for searching for the conditional sentence, and the number of conditional sentences to represent the primary defect cause-conditional sentence.

The maximum length of the conditional sentence is necessary as a first search setting value used in the search unit. As the number of attributes entering the conditional sentence is increased, the length of the conditional sentence is increased. Accordingly, search costs may be exponentially increased unless the length is limited. For this reason, a maximum length of the conditional sentence needs to be set. A second search setting value is the number of evaluations for searching for the conditional sentence. A better conditional sentence may be searched for as the number of evaluations is increased, but more time is wasted that much. For this reason, the number of evaluations may be limited. A third search setting value is the number of primary conditional sentences. The search unit outputs conditional sentences corresponding to a preset number of conditional sentences, and the final defect cause-conditional sentence from which a redundant and meaningless conditional sentence has been removed by the post-processing unit is finally output. Such search setting values used in the search unit merely correspond to an embodiment, and the present disclosure is not limited thereto. The conditional sentence may be searched for by applying various search setting values, in addition to a maximum length of a conditional sentence, the number of evaluations for searching for the conditional sentence, and the number of conditional sentences to represent the primary defect cause-conditional sentence.

The primary defect cause-conditional sentence is output through a genetic algorithm for constructing a population including a plurality of candidate solutions, calculating the fitness of each of the candidate solutions, and searching for an optimal solution while evolving the population through evolutionary computation.

More specifically, each of the plurality of candidate solution each encoded into a real number of 0 to 1 is converted into an operator and a conditional expression using head, body, and tail tables. Thereafter, a tree is generated until the tree is sequentially available, and is converted into the primary defect cause-conditional sentence. A degree that the primary defect cause-conditional sentence indicates a cause of a defect is evaluated through solution fitness calculation.

At step 430, the post-processing unit receives the primary defect cause-conditional sentence, removes a redundant conditional sentence, and outputs the final defect cause-conditional sentence.

The post-processing unit receives the primary defect cause-conditional sentence, removes a redundant portion of each primary defect cause-conditional sentence, and removes a conditional sentence based on the results of solution fitness calculation calculated by the search unit.

The post-processing unit performs the step of finally removing a meaningless conditional sentence among primary defect cause-conditional sentences retrieved by the search unit or deleting a meaningless conditional expression from a conditional sentence, and a detailed method thereof is as follows.

First, a redundant portion is removed from each primary defect cause-conditional sentence. For example, an (A and B) portion may be removed because a conditional sentence "A or (A and B)" is the same as A.

Second, if the WRA is not increased meaningfully although the length of a conditional sentence has been increased, a long conditional sentence is deleted. For example, although conditional sentences "A", and "A and B" are searched for, the WRA of the conditional sentence "A and B" is not better than that of the conditional sentence "A", the conditional sentence "A and B" is deleted.

The final defect cause-conditional sentence of a product, output by the apparatus for analyzing a cause of a product defect according to an embodiment of the present disclosure, has a form, such as "it is a defect when ~." For example, in the process data of FIG. 2, a conditional sentence, such as "it is a defect when a value of process 1-sensor 1 is 0 or more to 4.0 or less and a value of process 2-sensor 1 is 100", may be output.

The aforementioned apparatus may be implemented as a hardware element, a software element and/or a combination of them. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing apparatus may perform an operating system (OS) and one or more software applications executed on the OS. Furthermore, the processor may access, store, manipulate, process and generate data in response to the execution of software. For convenience of understanding, one processor has been illustrated as being used, but a person having ordinary skill in the art may understand that the processor may include a plurality of processing elements and/or a plurality of types of processing elements. For example, the processor may include a plurality of processors or one processor and one controller. Furthermore, other processing configurations, such as a parallel processor, are also possible.

Software may include a computer program, a code, an instruction or a combination of one or more of them, and may configure a processor so that it operates as desired or may instruct processors independently or collectively. Software and/or data may be embodied in any type of a machine, component, physical device, virtual equipment, or computer storage medium or device so as to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions, such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. An apparatus for analyzing a cause of a product defect, comprising:
   a pre-processing unit configured to receive process data and perform pre-processing for analyzing a cause of a product defect;
   a search unit configured to search for a primary defect cause-conditional sentence to represent a primary defect cause through solution encoding and decoding and solution fitness calculation for a plurality of candidate solutions in order to search for a conditional sentence using the pre-processed process data and to output the primary defect cause-conditional sentence; and
   a post-processing unit configured to receive the primary defect cause-conditional sentence, remove a redundant conditional sentence, and output a final defect cause-conditional sentence
   wherein the search unit
   searches for the primary defect cause-conditional sentence based on a search setting value, comprising a maximum length of a conditional sentence that limits an attribute entering the conditional sentence, a number of evaluations for searching for the conditional sentence, and a number of conditional sentences to represent the primary defect cause-conditional sentence,
   outputs the primary defect cause-conditional sentence through a genetic algorithm for constructing a population comprising the plurality of candidate solutions, calculating fitness of each candidate solution, and searching for an optimal solution while evolving the population through evolutionary computation,
   converts each of the plurality of candidate solution, each encoded into a real number of 0 to 1, into an operator and a conditional expression using head, body, and tail tables,
   generates a tree until the tree is sequentially available,
   converts the tree into the primary defect cause-conditional sentence, and
   evaluates a degree that the primary defect cause-conditional sentence indicates a cause of a defect through the solution fitness calculation.

2. The apparatus of claim 1, wherein the pre-processing unit
   receives the process data comprising an identifier of a product and sensor values collected according to a production flow of the product,
   removes process data having an error, and
   limits an attribute having a consecutive value or an attribute having a plurality of types of values to a predetermined number of types of values.

3. The apparatus of claim 1, wherein the post-processing unit
   receives the primary defect cause-conditional sentence,
   removes a redundant portion from each of the primary defect cause-conditional sentences, and
   removes a conditional sentence based on results of the solution fitness calculation calculated in the search unit.

4. A method of analyzing a cause of a product defect, comprising:
   receiving, by a pre-processing unit, process data and performing pre-processing for analyzing a cause of a product defect;
   searching for, by a search unit, a primary defect cause-conditional sentence to represent a primary defect cause through solution encoding and decoding and solution fitness calculation for a plurality of candidate solutions in order to search for a conditional sentence using the pre-processed process data and outputting the primary defect cause-conditional sentence; and
   receiving, by a post-processing unit, the primary defect cause-conditional sentence, removing a redundant conditional sentence, and outputting a final defect cause-conditional sentence,
   wherein searching for, by the search unit, the primary defect cause-conditional sentence to represent the primary defect cause through solution encoding and decoding and solution fitness calculation for the plurality of candidate solutions in order to search for the conditional sentence using the pre-processed process data and outputting the primary defect cause-conditional sentence comprises:

searching for the primary defect cause-conditional sentence based on a search setting value, comprising a maximum length of a conditional sentence that limits an attribute entering the conditional sentence, a number of evaluations for searching for the conditional sentence, and a number of conditional sentences to represent the primary defect cause-conditional sentence, and outputting the primary defect cause-conditional sentence through a genetic algorithm for constructing a population comprising the plurality of candidate solutions, calculating fitness of each candidate solution, and searching for an optimal solution while evolving the population through evolutionary computation, and the method further comprising:

converting each of the plurality of candidate solutions, each encoded into a real number of 0 to 1, into an operator and a conditional expression using head, body, and tail tables, generating a tree until the tree is sequentially available, converting the tree into the primary defect cause-conditional sentence, and evaluating a degree that the primary defect cause-conditional sentence indicates a cause of a defect through the solution fitness calculation.

5. The method of claim 4, wherein receiving, by the pre-processing unit, process data and performing pre-processing for analyzing the cause of the product defect comprises:

receiving the process data comprising an identifier of a product and sensor values collected according to a production flow of the product, removing process data having an error, and limiting an attribute having a consecutive value or an attribute having a plurality of types of values to a predetermined number of types of values.

6. The method of claim 4, wherein receiving, by the post-processing unit, the primary defect cause-conditional sentence, removing the redundant conditional sentence, and outputting the final defect cause-conditional sentence comprises:

receiving the primary defect cause-conditional sentence, removing a redundant portion from each of the primary defect cause-conditional sentences, and removing a conditional sentence based on results of the solution fitness calculation calculated in the search unit.

* * * * *